(12) United States Patent
Chen et al.

(10) Patent No.: US 11,740,824 B2
(45) Date of Patent: Aug. 29, 2023

(54) PERFORMING WEAR LEVELING BETWEEN STORAGE SYSTEMS OF A STORAGE CLUSTER

(71) Applicant: Dell Products L.P., Round Rock, TX (US)

(72) Inventors: Chi Chen, Chengdu (CN); Hailan Dong, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 17/182,942

(22) Filed: Feb. 23, 2021

(65) Prior Publication Data
US 2022/0244877 A1    Aug. 4, 2022

(30) Foreign Application Priority Data

Feb. 4, 2021    (CN) .......................... 202110158120.4

(51) Int. Cl.
| G06F 12/00 | (2006.01) |
| G06F 13/00 | (2006.01) |
| G06F 3/06 | (2006.01) |
| G06F 16/182 | (2019.01) |

(52) U.S. Cl.
CPC ............ G06F 3/0647 (2013.01); G06F 3/067 (2013.01); G06F 3/0616 (2013.01); G06F 16/182 (2019.01)

(58) Field of Classification Search
CPC ...... G06F 3/0647; G06F 3/0616; G06F 3/067; G06F 16/182
USPC ........................................................ 711/165
See application file for complete search history.

(56) References Cited

U.S. PATENT DOCUMENTS

| 3,769,843 | A  | * | 11/1973 | Sperberg | ................. | G01N 3/56 |
| | | | | | | 73/146 |
| 7,249,227 | B1 | * | 7/2007 | Pittman | .................. | G06F 3/067 |
| | | | | | | 711/154 |
| 8,027,195 | B2 | * | 9/2011 | Li | .......................... | G11C 16/10 |
| | | | | | | 365/185.11 |
| 8,102,705 | B2 | * | 1/2012 | Liu | ........................ | G11C 16/34 |
| | | | | | | 365/189.05 |

(Continued)

OTHER PUBLICATIONS

Srimugunthan et al., "Distributed Wear Leveling of Flash Memories," arXiv:1302.5999v1, Feb. 25, 2013, 8 pages.

(Continued)

*Primary Examiner* — Sheng Jen Tsai
(74) *Attorney, Agent, or Firm* — Ryan, Mason & Lewis, LLP

(57) ABSTRACT

An apparatus comprises at least one processing device comprising a processor coupled to a memory. The at least one processing device is configured to obtain usage information for each of two or more storage systems of a storage cluster, and to determine a wear level of each of the storage systems of the storage cluster based at least in part on the obtained usage information. The at least one processing device is also configured to identify a wear level imbalance of the storage cluster based at least in part on the determined wear levels of each of the storage systems of the storage cluster. The at least one processing device is further configured, responsive to the identified wear level imbalance of the storage cluster being greater than an imbalance threshold, to move storage objects between the storage systems of the storage cluster.

20 Claims, 11 Drawing Sheets

500

STORAGE CLUSTER ARRAY STATUS

| STORAGE ARRAY | CAPACITY USAGE (TB) | IO TEMPERATURE | ARRAY WEAR (WRITE REQUESTS COUNT) |
|---|---|---|---|
| ARRAY 1 | $C_{Array1} = 14.7$ | $T_{Array1} = 7378$ | 160000 |
| ARRAY 2 | $C_{Array2} = 53$ | $T_{Array2} = 10666$ | 300000 |
| ARRAY3 | $C_{Array2} = 70$ | $T_{Array3} = 10000$ | 670000 |

505

NORMALIZED STORAGE ARRAY WEAR LEVELS

| STORAGE ARRAY | NORMALIZED STORAGE ARRAY WEAR LEVEL |
|---|---|
| ARRAY 1 | $R_{Array1} = 0.185233036$ |
| ARRAY 2 | $R_{Array2} = 0.343441941$ |
| ARRAY3 | $R_{Array3} = 0.471325023$ |

(56) References Cited

U.S. PATENT DOCUMENTS

| | | | | |
|---|---|---|---|---|
| 8,170,893 | B1* | 5/2012 | Rossi | G06Q 10/063 705/7.11 |
| 9,229,854 | B1* | 1/2016 | Kuzmin | G06F 3/0679 |
| 9,450,876 | B1* | 9/2016 | Marr | G06F 12/0246 |
| 9,710,176 | B1* | 7/2017 | Tang | G06F 12/0246 |
| 9,811,288 | B1* | 11/2017 | Chen | G06F 3/0685 |
| 10,242,011 | B1* | 3/2019 | Basov | G06F 16/18 |
| 10,242,012 | B1* | 3/2019 | Basov | G06F 16/128 |
| 10,346,360 | B1* | 7/2019 | Basov | G06F 16/182 |
| 10,445,229 | B1* | 10/2019 | Kuzmin | G06F 3/0659 |
| 11,068,389 | B2* | 7/2021 | Gao | G06F 3/0688 |
| 2008/0192544 | A1* | 8/2008 | Berman | G11C 11/5621 365/185.09 |
| 2009/0241010 | A1* | 9/2009 | Yano | G11C 29/52 714/764 |
| 2010/0064111 | A1* | 3/2010 | Kunimatsu | G06F 12/0804 711/E12.001 |
| 2010/0082890 | A1* | 4/2010 | Heo | G06F 9/4403 711/E12.001 |
| 2011/0173378 | A1* | 7/2011 | Filor | G11C 29/765 711/E12.008 |
| 2011/0258391 | A1* | 10/2011 | Atkisson | H04L 12/4625 711/E12.017 |
| 2012/0198174 | A1* | 8/2012 | Nellans | G06F 3/0655 711/E12.009 |
| 2013/0198439 | A1* | 8/2013 | Kurotsuchi | G06F 12/1009 711/103 |
| 2014/0129758 | A1* | 5/2014 | Okada | G06F 12/0246 711/E12.008 |
| 2014/0181376 | A1* | 6/2014 | Miyamoto | G06F 12/0246 711/103 |
| 2014/0192583 | A1* | 7/2014 | Rajan | G11C 7/10 365/63 |
| 2014/0215129 | A1* | 7/2014 | Kuzmin | G06F 12/0246 711/103 |
| 2016/0085459 | A1* | 3/2016 | Hutchison | G06F 3/0688 711/154 |
| 2016/0188219 | A1* | 6/2016 | Peterson | G06F 12/0246 711/103 |
| 2016/0188221 | A1* | 6/2016 | Janik | G06F 3/0611 711/103 |
| 2016/0232954 | A1* | 8/2016 | Kim | G11C 16/3495 |
| 2017/0003889 | A1* | 1/2017 | Kim | G06F 3/067 |
| 2018/0113640 | A1* | 4/2018 | Fernandez | G06F 3/0638 |
| 2019/0200977 | A1* | 7/2019 | Shelton, IV | A61B 17/068 |
| 2019/0206565 | A1* | 7/2019 | Shelton, IV | A61B 90/37 |
| 2019/0220363 | A1 | 7/2019 | Zhang et al. | |
| 2019/0324656 | A1 | 10/2019 | Xiao et al. | |
| 2019/0332526 | A1* | 10/2019 | Xu | G06F 3/0616 |
| 2020/0142628 | A1 | 5/2020 | Armangau et al. | |
| 2021/0182206 | A1* | 6/2021 | Raasch | G06F 12/1009 |
| 2021/0255799 | A1* | 8/2021 | Kale | G06N 3/088 |
| 2021/0256349 | A1* | 8/2021 | Bielby | G06F 12/0868 |
| 2021/0318825 | A1* | 10/2021 | Fan | G06F 3/0604 |
| 2022/0027058 | A1* | 1/2022 | Basu | G06F 3/0632 |

OTHER PUBLICATIONS

Y. Cheng, "Mean Shift, Mode Seeking, and Clustering," IEEE Transactions on Pattern Analysis and Machine Intelligence,, vol. 17, No. 8, Aug. 1995, pp. 790-799.

Dell Technologies, "Dell EMC CloudIQ: A Detailed Review," Technical White Paper, Jun. 2020, 101 pages.

* cited by examiner

ARRAY 1 STORAGE OBJECTS — 700

| STORAGE OBJECT | SIZE | IO TEMPERATURE | HOT DEGREE |
|---|---|---|---|
| OBJECT 1 | 5 | 3283 | 656.6 |
| OBJECT 2 | 2 | 782 | 391 |
| OBJECT 3 | 3.5 | 377 | 107.7143 |
| OBJECT 4 | 4.2 | 2936 | 699.0476 |

ARRAY 2 STORAGE OBJECTS — 705

| STORAGE OBJECT | SIZE | IO TEMPERATURE | HOT DEGREE |
|---|---|---|---|
| OBJECT 1 | 10 | 1800 | 180 |
| OBJECT 2 | 18 | 3580 | 198.8889 |
| OBJECT 3 | 12 | 1780 | 148.3333 |
| OBJECT 4 | 5 | 2345 | 469 |
| OBJECT 5 | 3.5 | 467 | 133.4286 |
| OBJECT 6 | 4.5 | 694 | 154.2222 |

ARRAY 3 STORAGE OBJECTS — 710

| STORAGE OBJECT | SIZE | IO TEMPERATURE | HOT DEGREE |
|---|---|---|---|
| OBJECT 1 | 20 | 2750 | 137.5 |
| OBJECT 2 | 8 | 1295 | 161.875 |
| OBJECT 3 | 10 | 1450 | 145 |
| OBJECT 4 | 8 | 1195 | 149.375 |
| OBJECT 5 | 2 | 290 | 145 |
| OBJECT 6 | 5 | 3795 | 759 |
| OBJECT 7 | 7 | 635 | 90.71429 |
| OBJECT 8 | 5 | 1200 | 240 |
| OBJECT 9 | 5 | 390 | 78 |

FIG. 7

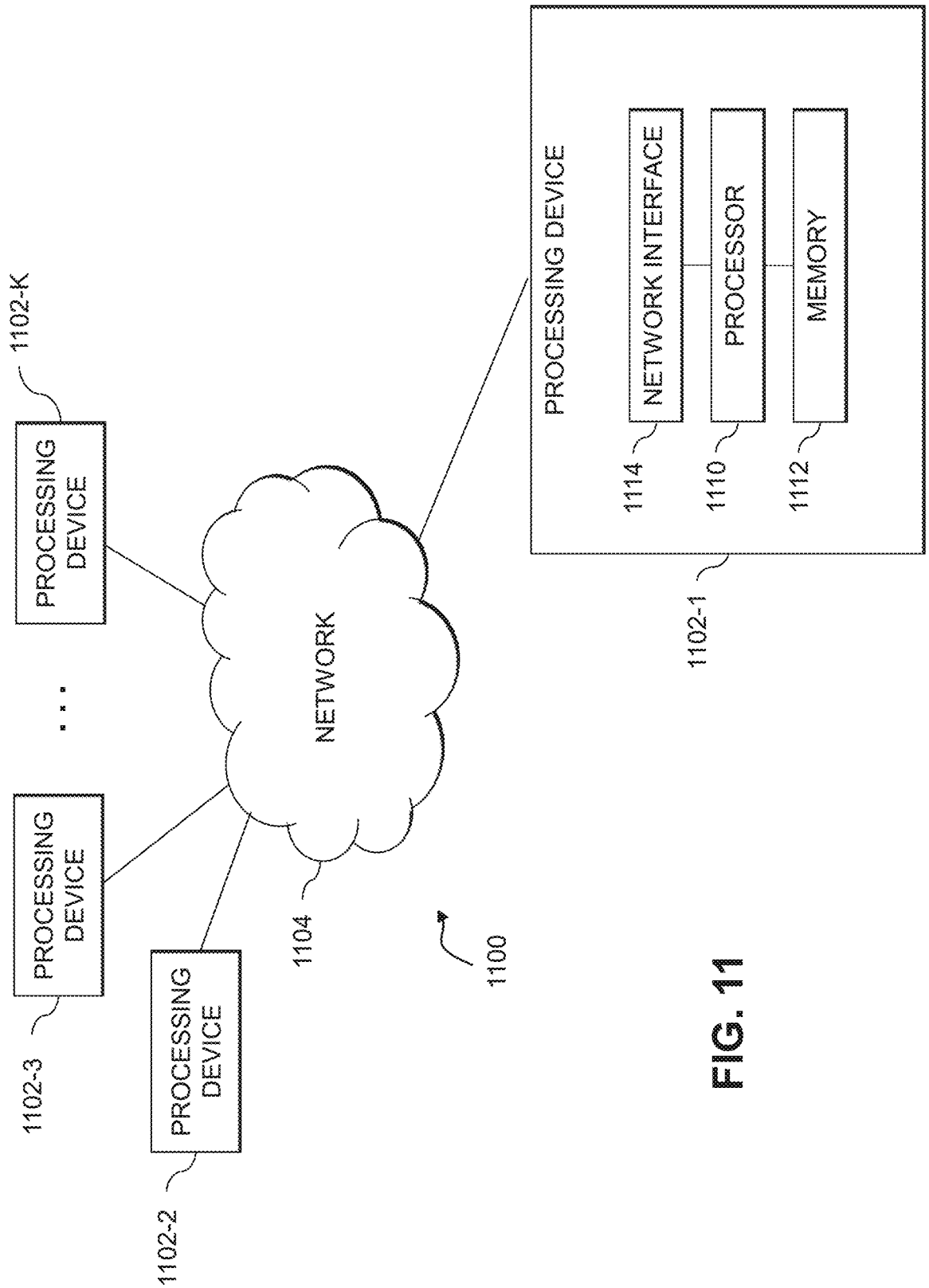

PERFORMING WEAR LEVELING BETWEEN STORAGE SYSTEMS OF A STORAGE CLUSTER

RELATED APPLICATION

The present application claims priority to Chinese Patent Application No. 202110158120.4, filed on Feb. 4, 2021 and entitled "Performing Wear Leveling Between Storage Systems of a Storage Cluster," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for performing wear leveling between storage systems of a storage cluster.

In one embodiment, an apparatus comprises at least one processing device comprising a processor coupled to a memory. The at least one processing device is configured to perform the steps of obtaining usage information for each of two or more storage systems of a storage cluster, determining a wear level of each of the two or more storage systems of the storage cluster based at least in part on the obtained usage information, and identifying a wear level imbalance of the storage cluster based at least in part on the determined wear levels of each of the two or more storage systems of the storage cluster. The at least one processing device is further configured to perform the step of, responsive to the identified wear level imbalance of the storage cluster being greater than an imbalance threshold, moving one or more storage objects between the two or more storage systems of the storage cluster.

These and other illustrative embodiments include, without limitation, methods, apparatus, networks, systems and processor-readable storage media.

BRIEF DESCRIPTION OF THE DRAWINGS

FIG. 7 shows tables of storage objects stored on storage arrays of a storage cluster in an illustrative embodiment.

FIGS. 10 and 11 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
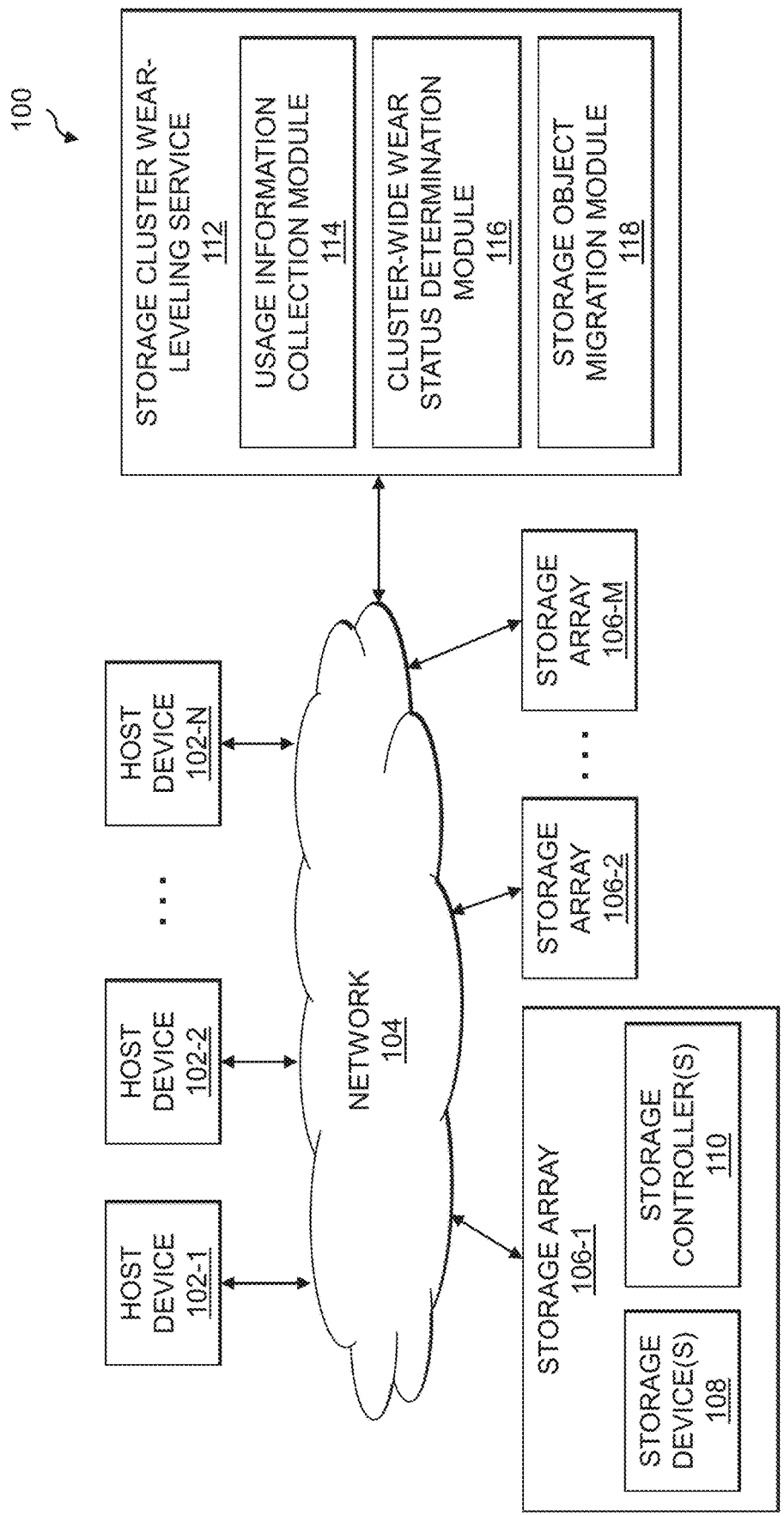
FIG. 1 is a block diagram of an information processing system for performing wear leveling between storage systems of a storage cluster in an illustrative embodiment.

FIG. 1 shows an information processing system 100 configured in accordance with an illustrative embodiment to provide functionality for storage cluster-wide wear balancing among storage systems of a storage cluster. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the information processing system 100 of FIG. 1, multiple ones of the storage arrays 106 are assumed to be part of a storage cluster, and the host devices 102 are assumed to submit IO operations to be processed by the storage cluster. At least one of the storage controllers of the storage arrays 106 (e.g., the storage controller 110 of storage array 106-1) are assumed to implement storage cluster management functionality for the storage cluster. Such storage cluster management functionality may alternatively be implemented external to the storage arrays 106 of the storage cluster (e.g., such as on a dedicated server, on host devices 102, etc.). The information processing system 100 further includes a storage cluster wear-leveling service 112 that is configured to provide functionality for implementing wear-leveling among the storage arrays 106 of the storage cluster. The storage cluster wear-leveling service 112 includes a usage information collection module 114, a cluster-wide wear status determination module 116, and a storage object migration module 118.

The usage information collection module 114 is configured to obtain usage information for each of the storage arrays 106 that are part of a storage cluster. The cluster-wide wear status determination module 116 is configured to determine a wear level of each of the storage arrays 106 of the storage cluster based at least in part on the obtained usage information, and to identify a wear level imbalance of the storage cluster based at least in part on the determined wear levels of each of the storage arrays 106 of the storage cluster. The storage object migration module 118 is configured, responsive to the identified wear level imbalance of the storage cluster being greater than an imbalance threshold, to move one or more storage objects between the storage arrays 106 of the storage cluster.

At least portions of the functionality of the usage information collection module 114, the cluster-wide wear status determination module 116 and the storage object migration module 118 may be implemented at least in part in the form of software that is stored in memory and executed by a processor.

Although shown as external to the host devices 102 and storage arrays 106 in the FIG. 1 embodiment, it should be appreciated that the storage cluster wear-leveling service 112 in other embodiments may be implemented at least in part internal to one or more of the host devices 102 and/or one or more of the storage arrays 106 (e.g., such as on the storage controllers 110 of storage array 106-1).

The host devices 102, storage arrays 106 and storage cluster wear-leveling service 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the storage cluster wear-leveling service 112 may be implemented on respective distinct processing platforms, although numerous other arrangements are possible. For example, in some embodiments at least portions of one or more of the host devices 102, the storage arrays 106 and the storage cluster wear-leveling service 112 are implemented on the same processing platform. The storage cluster wear-leveling service 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the storage cluster wear-leveling service 112 may be implemented at least in part in the first geographic location, the second geographic location, and one or more other geographic locations. Thus, it is possible in some implementations of the system 100 for different ones of the host devices 102, the storage arrays 106 and the storage cluster wear-leveling service 112 to reside in different data centers.

Numerous other distributed implementations of the host devices 102, the storage array 106 and the storage cluster wear-leveling service 112 are possible. Accordingly, the host devices 102, the storage array 106 and the storage cluster wear-leveling service 112 can also be implemented in a distributed manner across multiple data centers.

Additional examples of processing platforms utilized to implement portions of the system 100 in illustrative embodiments will be described in more detail below in conjunction with FIGS. 10 and 11.

It is to be understood that the particular set of elements shown in FIG. 1 for performing wear leveling between storage systems of a storage cluster is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for performing wear leveling between storage systems of a storage cluster will now be described in more detail with reference to the flow diagram of FIG. 2. It is to be understood that this particular process is only an example, and that additional or alternative processes for performing wear leveling between storage systems of a storage cluster may be used in other embodiments.

In this embodiment, the process includes steps 200 through 206. These steps are assumed to be performed by the storage cluster wear-leveling service 112 utilizing the usage information collection module 114, the cluster-wide wear status determination module 116, and the storage object migration module 118. The process begins with step 200, obtaining usage information for each of two or more storage systems of a storage cluster. The obtained usage information may comprise capacity usage information for each of the two or more storage systems of the storage cluster, IO temperature information characterizing a number of input-output requests within a designated threshold of a current time for each of the two or more storage systems of the storage cluster, and cumulative write requests count information for each of the two or more storage systems of the storage cluster.

In step 202, a wear level of each of the two or more storage systems of the storage cluster is determined based at least in part on the obtained usage information. This may comprise, for a given one of the two or more storage systems, computing a weighted sum of the capacity usage information for the given storage system, the input-output temperature information for the given storage system, and the cumulative write requests count information for the given storage system. A first weight assigned to the capacity usage information for the given storage system may be lower than a second weight assigned to the input-output temperature information and a third weight assigned to the cumulative write requests count information for the given storage system.

Figure 2:
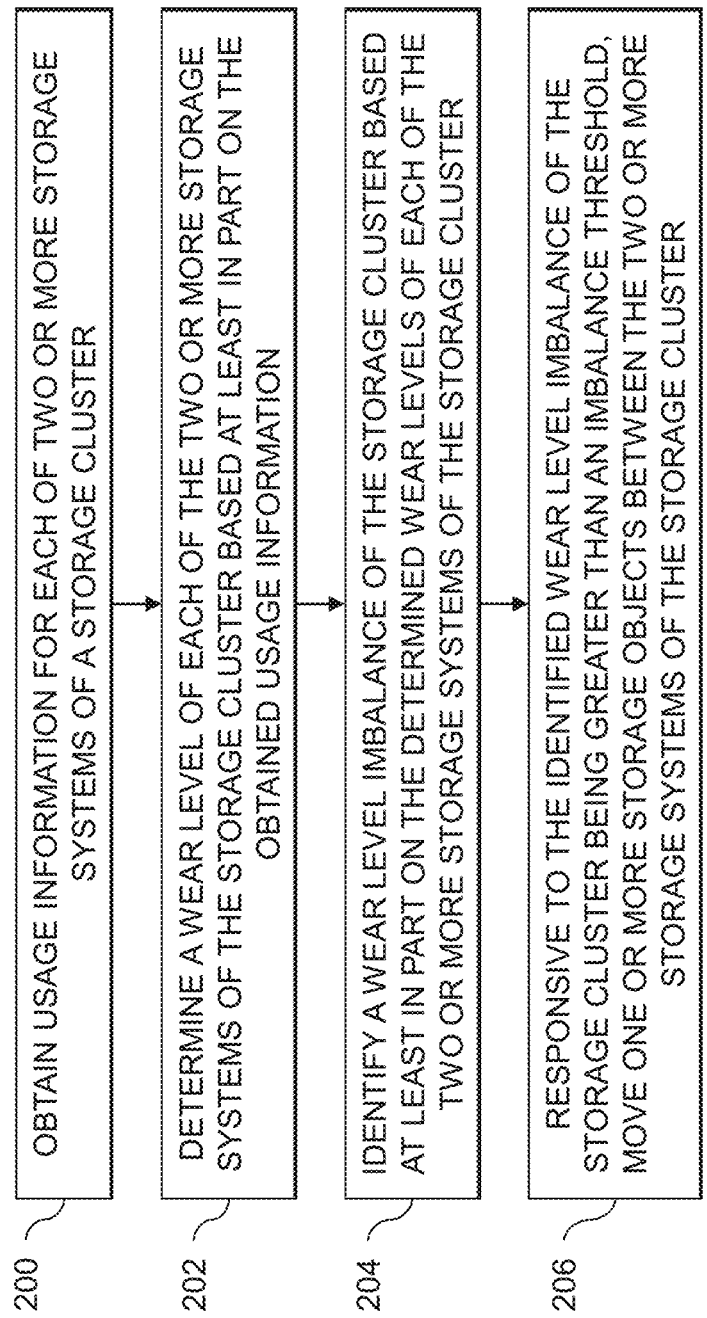
FIG. 2 is a flow diagram of an exemplary process for performing wear leveling between storage systems of a storage cluster in an illustrative embodiment.

The FIG. 2 process continues in step 204 with identifying a wear level imbalance of the storage cluster based at least in part on the determined wear levels of each of the two or more storage systems of the storage cluster. Step 204 may include determining an average of the wear levels of the two or more storage systems of the storage cluster, determining a standard deviation of the wear levels of the two or more storage systems of the storage cluster, and determining the wear level imbalance of the storage cluster as a ratio of the standard deviation and the average of the wear levels of the two or more storage systems of the storage cluster.

In step 206, one or more storage objects are moved between the two or more storage systems of the storage cluster responsive to the identified wear level imbalance of the storage cluster being greater than an imbalance threshold. A first one of the two or more storage systems may be part of a first distributed filesystem and a second one of the two or more storage systems may be part of a second distributed filesystem different than the first distributed filesystem. In some embodiments, a first one of the two or more storage systems utilizes block-based storage and a second one of the two or more storage systems utilizes file-based storage, and the first and second storage systems supply block and file storage services independent of one another.

Step 206 may include selecting a first one of the two or more storage systems of the storage cluster as a source storage system and selecting a second one of the two or more storage systems of the storage cluster as a destination storage system, and selecting a given storage object stored on the first storage system to be moved to the second storage system, where the first storage system has a higher determined wear level than the second storage system. Selecting the given storage object may comprise determining, for each of at least a subset of storage objects stored on the first storage system, hot degree information characterizing a number of write requests per unit capacity, and selecting the given storage object from among the subset of storage objects stored on the first storage system based at least in part on the determined hot degree information. Moving the one or more storage objects between the two or more storage systems of the storage cluster may further comprise re-determining wear levels of the first storage system and the second storage system supposing that the given storage object is moved from the first storage system to the second storage system, and moving the given storage object from the first storage system to the second storage system responsive to the re-determined wear level of the first storage system being less than or equal to the re-determined wear level of the second storage system.

In some embodiments, step 206 comprises performing two or more iterations of selecting first and second ones of the two or more storage systems of the storage cluster as respective source and destination storage systems for moving a given one of the one or more storage objects, determining, if the given storage object were moved from the first storage system to the second storage system, whether a wear level of the first storage system will be less than or equal to a wear level of the second storage system, and moving the given storage object from the first storage system to the second storage system responsive to determining that the wear level of the first storage system will be less than or equal to the wear level of the second storage system. The given storage object may be selected based at least in part on (i) amounts of input-output requests directed to storage objects stored on the first storage system and (ii) sizes of the storage objects stored on the first storage system. Performing the two or more iterations may continue until a given iteration where it is determined that, if the given storage object were moved from the first storage system to the second storage system, the wear level of the first storage system will be greater than the second storage system.

Storage arrays may implement wear-leveling mechanisms to balance the wear among storage devices of the storage array (e.g., balance SSD wear among the disks in the storage array). From a storage array cluster view, however, there may be many different storage arrays. As the data stored on the storage array cluster changes, this may result in un-even wear leveling between different ones of the storage arrays, even if wear leveling is performed by each of the storage arrays individually for the storage devices in those storage arrays. In other words, even if wear leveling is performed locally at each storage array in a cluster, there may be un-even wear leveling between different ones of the storage arrays in the cluster. This could result, for example, in the storage devices of some of the storage arrays in the cluster wearing out while the storage devices of other ones of the storage arrays in the cluster are not fully leveraged. Thus, the overall storage device (e.g., SSD drive) efficiency in the cluster is poor. Current wear-leveling mechanisms are not able to handle these scenarios, and thus performance is negatively affected. Manual balancing across storage arrays in a cluster is also problematic, as it is difficult to determine wear balancing across multiple storage arrays (particularly as the number of storage arrays in a cluster increases), and there is a lack of expertise for it.

Illustrative embodiments provide techniques for implementing inter-storage array wear leveling for storage array clusters. In some embodiments, storage device wear leveling status is monitored for all storage arrays in a cluster, as well as IO metrics (e.g., IO temperature) for all of the storage arrays of the cluster. The IO metrics or IO temperature may be measured or determined at various levels of granularity, such as LUNs, filesystems, virtual machine filesystems (VMFSs), etc. Based on this data, wear leveling between the storage arrays of the cluster is implemented (e.g., by moving LUNs, filesystems, VMFSs, etc. among the storage arrays of the cluster) to achieve evenly distributed wear leveling between all of the storage arrays. The migration of data may be performed automatically, or may be suggested to a storage administrator or other authorized user of the storage cluster in order to achieve cluster-wide wear leveling.

In some embodiments, storage cluster wide wear leveling, also referred to as inter-storage array wear leveling, is implemented as a low-level service of a storage cluster management component that gets all the wear leveling and IO information for the storage arrays of a storage cluster. In this way, the storage cluster management component can use the inter-storage array wear leveling functionality to improve the overall efficiency of storage devices used in different storage arrays of the storage cluster as a whole. The inter-storage array wear leveling functionality may be used for various different types of storage clusters, including storage clusters which utilize different types of storage arrays (e.g., different storage products from one or more storage vendors). Further, the inter-storage array wear leveling functionality does not require that all storage nodes or storage arrays in the storage cluster belong to the same distributed filesystem (e.g., Coda, Lustre, Hadoop distributed file system (HDFS), Ceph). The inter-storage array wear leveling functionality supports block and file storage arrays between which there is no mapping table, where such storage arrays supply block and file storage services independently.

Figure 3:
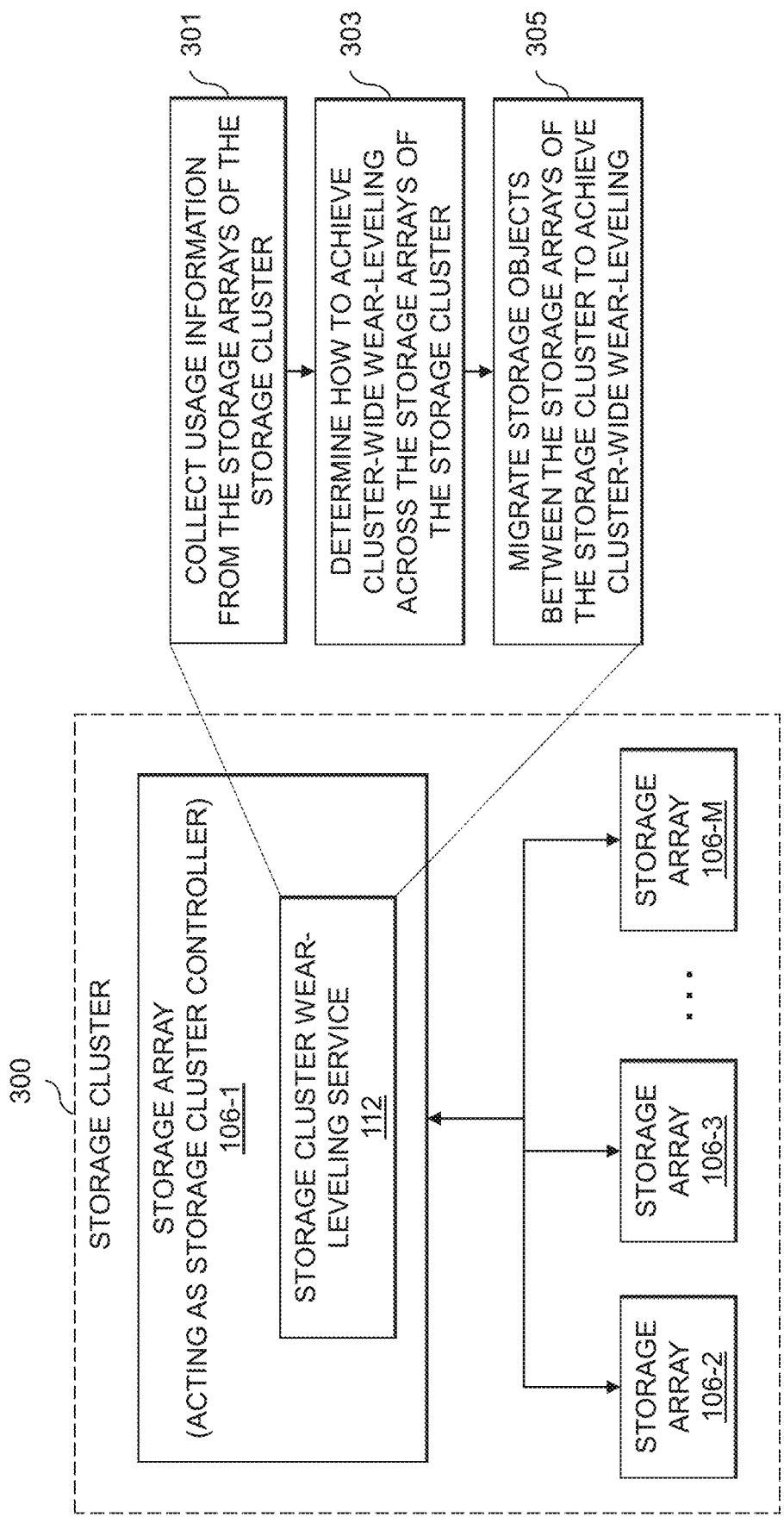
FIG. 3 shows a storage cluster implementing storage cluster-wide wear leveling in an illustrative embodiment.

FIG. 3 shows an example configuration wherein the storage cluster wear-leveling service 112 is implemented internal to one of the storage arrays 106-1 acting as a storage cluster controller for a storage cluster 300 comprising the storage arrays 106-1 through 106-M. It should be appreciated, however, that in some embodiments the storage cluster wear-leveling service 112 may be implemented external to the storage arrays 106-1 through 106-M (e.g., as shown in FIG. 1), or may be implemented at least partially internal to one or more of the host devices 102, or may itself be implemented or distributed across multiple ones of the host devices 102 and/or storage arrays 106. In the FIG. 3 example, the storage array 106-1 implements the storage cluster wear-leveling service 112 as a low-level service of a cluster management component of the storage cluster 300. The storage array 106-1 in this example is chosen from the cluster 300 to act in the role of the cluster controller and thus runs the storage cluster wear-leveling service 112.

The storage cluster wear-leveling service 112 implements a series of steps (e.g., using the usage information collection module 114, the cluster-wide wear-leveling determination module 116, and the storage object migration module 118) for implementing storage cluster wear-leveling. In step 301, the storage cluster wear-leveling service 112 uses the usage information collection module 114 to collect various usage information data from each of the storage arrays 106 that are part of the storage cluster. The collected usage information data may include, but is not limited to: wear level status of the storage devices in each of the storage arrays 106; capacity usage of the storage devices in each of the storage arrays 106; IO temperature of the storage devices in each of the storage arrays 106; the size of various storage objects (e.g., LUNs, filesystems, VMFSs, etc.) stored on the storage devices in each of the storage arrays; IO temperature of the storage objects; etc.

In step 303, the storage cluster wear-leveling service 112 utilizes the cluster-wide wear-leveling determination module 116 to use the data collected in step 301 to calculate and evaluate if the wear level in the storage cluster 300 is an undesirable condition (e.g., some designated threshold un-even wear level). If the result is yes, step 303 further includes determining how to achieve cluster-wide wear-leveling across the storage arrays 106 of the storage cluster 300 using a storage object or other data migration solution. The storage object or other data migration solution may be determined using rebalancing algorithms described in further detail elsewhere herein.

In step 305, the storage cluster wear-leveling service 112 utilizes the storage object migration module 118 to migrate storage objects between the storage arrays 106 of the storage cluster 300 to achieve a desired cluster-wide wear-leveling. Step 305 may include automating movement of storage objects among the storage arrays 106, providing guidance to a storage administrator of the storage cluster 300 as to how to perform manual data migrations to achieve the desired cluster-wide wear-leveling, combinations thereof, etc. Storage object migration may be handled via Federated Live Migration (FLM), replication, Inband Migration Tool (IMT) or other data migration tools.

An algorithm for evaluating and balancing the wear leveling of a storage cluster, such as storage cluster 300, will now be described. Assume that the storage cluster comprises M storage arrays, and that each storage array has N storage devices (also referred to as disks). It should be appreciated, however, that the value of "N" may be different for each of the storage arrays in the storage cluster. In other words, the different storage arrays are not required to have equal numbers of disks. Capacity usage is represented by C, IO temperature is represented by T, and wear level (e.g., a write requests count for SSD disks) is represented by W. A storage array's wear level can be measured using these three criteria C, T and W. The array wear level status in the storage cluster may be calculated by combining C, T and W. The standard deviation of the storage arrays' wear level in the storage cluster is then calculated and used to measure the imbalance rate of the storage cluster. Once the storage cluster-wide wear level reaches a designated imbalance rate threshold, candidate source and destination storage arrays for data or storage object migration are determined along with the data migration targets.

$C_{Disk}$ is used to denote the capacity usage of a disk, and $C_{Array}$ denotes the sum of the disk capacity usage for the disks of a storage array, which is calculated as $C_{Array} = \Sigma_{j=1}^{N} C_{Diskj}$. The more capacity usage of the storage array, the more the storage array is considered worn and thus the less storage objects should be moved to the storage array. N, as noted above, denotes the number of disks on the storage array. $T_{Disk}$ denotes the IO temperature of a disk, which can be calculated by a current MCR component, and $T_{Array}$ denotes the sum of the IO temperatures for the disks in a storage array which is calculated according to $T_{Array} = \Sigma_{j=1}^{N} T_{Diskj}$. $W_{Disk}$ denotes the write requests count of a disk, which reflects the wear level of the disk, and $W_{Array}$ denotes the sum of the write request counts for the disks of a storage array. The bigger $W_{Disk}$ is, the closer to worn out the disk is. $W_{Disk}$ may be calculated by the current MCR component. $W_{Array}$ may be calculated according to $W_{Array} = \Sigma_{j=1}^{N} W_{Diskj}$.

A storage array's wear level may be measured according to:

$$R_i = \omega_C \cdot \frac{C_{Arrayi}}{\sum_{i=1}^{M} C_{Arrayi}} + \omega_T \cdot \frac{T_{Arrayi}}{\sum_{i=1}^{M} T_{Arrayi}} + \omega_W \cdot \frac{W_{Array}}{\sum_{i=1}^{M} W_{Arrayi}}$$

The larger the value of $R_i$ for a storage array i, the more the storage array i is aging. $R_i$ is determined as combination of the three criteria of capacity usage, IO temperature, and wear level degree. $\omega_C$, $\omega_T$ and $\omega_W$ denote weights for capacity usage, IO temperature and wear level criteria, respectively, and $\omega_C + \omega_T + \omega_W = 1$. By tuning the values of the weights $\omega_C$, $\omega_T$ and $\omega_W$, better overall balancing results may be achieved. $R_{average}$ denotes the average wear level of the storage arrays in a storage cluster, and may calculated according to $$R_{average} = \frac{\sum_{i=1}^{M} R_i}{M}.$$

The standard deviation of the storage arrays' wear level in the storage cluster is denoted as $\sigma$, and may be calculated according to $$\sigma = \sqrt{\frac{\sum_{i=1}^{M} (R_i - R_{average})^2}{M}}.$$

The standard deviation $\sigma$ may be viewed or used as a measure of the imbalance rate of the storage cluster. A low standard deviation indicates that wear degrees of arrays tend to be close to the mean (also referred to as the expected value) of the set, while a high standard deviation indicates that the wear is imbalanced in the storage cluster and thus there is a need to rebalance. $\lambda$ denotes the imbalance rate of the storage cluster, and is calculated according to $$\lambda = \frac{\sigma}{R_{average}}.$$

$\Theta$ denotes an acceptable threshold value of the imbalance rate of the storage cluster. If in the storage cluster the value of $\lambda$ is equal to or bigger than $\Theta$, then there is a need to rebalance. $S_{object}$ denotes the size of a storage object, and $T_{object}$ denotes the temperature of a storage object, measured by write requests. $H_{object\_k}$ denotes a storage object's "hot degree" measured by write requests per unit capacity, calculated according to $$H_{objectk} = \frac{T_{objectk}}{S_{objectk}}.$$

The storage cluster wear-leveling service 112 in some embodiments is configured to periodically evaluate the current cluster-wide wear level by calculating the imbalance rate $\lambda$ of the storage cluster. After the imbalance rate $\lambda$ exceeds a designated threshold value $\Theta$ (e.g., $\lambda \geq \Theta$), the storage cluster wear-leveling service 112 will choose a source storage array and a destination storage array and move optimized storage objects (e.g., LUNs, filesystems, VMFSs, etc.) with high IO temperature from the source storage array to the destination storage array to balance the storage cluster's wear level. The value of $\Theta$ may be tuned as desired, such as based on the expected wear level of the storage cluster. If a storage cluster is expected or desired to have low imbalance wear-leveling, then $\Theta$ may be set to a small value (e.g., such as ~10-20%) to trigger the rebalancing algorithm early. If it is not desired to trigger the rebalancing algorithm early, then $\Theta$ may be set to a larger value (e.g., such as ~20-40%).

Storage device wear level (e.g., SSD or flash drive wear level) is a result of long-term IO load, representing the worn status of the storage devices not a temporary load status. When a storage cluster reaches the imbalance rate threshold, the re-balancing algorithm is triggered. After the re-balancing algorithm is completed (e.g., after movement of storage objects among the storage arrays of a storage cluster), the storage cluster imbalance rate will drop to a small value (e.g., usually smaller than 5%). The re-balancing algorithm may thus be triggered relatively infrequently (e.g., the time it would take to go from the small imbalance rate of 5% to the imbalance threshold of 20%) due to its efficiency and the fact that the re-balancing algorithm is triggered based on the cumulative IO load rather than temporary IO load. As noted above, the imbalance threshold may be tuned as desired to avoid frequently triggering re-balancing.

It should be appreciated that the storage cluster wear-leveling service 112 may be deployed on a storage cluster when that storage cluster is first created, or may be deployed sometime thereafter (e.g., to a middle-aged storage cluster) when it is expected that there may be benefits to rebalancing the wear level. The re-balancing algorithm, however, is only triggered when the imbalance rate threshold is reached. To avoid the re-balancing algorithm impact user IO of the storage cluster, the storage object movement task may be set as a lower priority and/or run as a background process on the cluster management node to reduce or eliminate such impacts. In this way, the storage cluster can be kept in a useful state while the wear level re-balancing is going on. Further, as detailed above the combination of the efficiency of the re-balancing and appropriately setting the imbalance rate threshold results in the re-balancing algorithm being triggered infrequently (e.g., after re-balancing, it takes time for wear-leveling to reach the imbalance rate threshold).

The steps of evaluating and balancing the storage cluster-wide wear level will now be described in detail. The first step includes calculating the arrays' wear level R in the storage cluster, and getting the source and destination storage arrays for a storage object migration. $R_i$ is calculated for each storage array i in the storage cluster. The array with the maximum wear level, $R_{max}$, is selected as the source storage array which is the most worn storage array. If there are multiple storage arrays with the same maximum value, then one of such storage arrays may be randomly selected as the source storage array. The array with the minimum wear level, is selected as the destination storage array. If there are multiple storage arrays with the same minimum value, then one of such storage arrays may be randomly selected as the destination storage array. $R_i$ is then calculated as described above with normalizing criteria according to:

$$R_i = \omega_c \cdot \frac{C_{Arrayi}}{\sum_{i=1}^{M} C_{Arrayi}} + \omega_T \cdot \frac{T_{Arrayi}}{\sum_{i=1}^{M} T_{Arrayi}} + \omega_W \cdot \frac{W_{Array}}{\sum_{i=1}^{M} W_{Arrayi}}$$

The next step is to calculate the source storage object's hot degree, and get the target storage object which will move from the source storage array to the destination storage array. The storage objects residing in the source storage array are sorted, and then the object with the maximum hot degree, $H_{max}$, is selected as the target storage object to be moved from the source storage array to the destination storage array. The hot degree criterion H is calculated according to $$H_{objectk} = \frac{T_{objectk}}{S_{objectk}},$$

using the storage object's IO temperature (e.g., write requests) divided by the storage object's size. The value of $H_{object\,k}$ is this a write requests per unit capacity. The larger the value of $H_{object\,k}$, the hotter the storage object k such that moving that storage object gets better results with smaller cost.

Supposing that the storage object with $H_{max}$ is moved from the source storage array to the destination storage array, the wear level of the source storage array, $R_{source}$, and the destination storage array, $R_{destination}$, are re-calculated. If $R_{source} \leq R_{destination}$, then there is no need to migrate the storage object and the rebalancing algorithm may be ended to avoid over-adjustment. If $R_{source} > R_{destination}$, the object with $H_{max}$ is migrated from the source storage array to the destination storage array. The process may then be repeated as desired to re-calculate new source and destination storage arrays, and then to re-calculate storage objects' hot degree on the new source storage array to potentially migrate the hottest storage object from the new source storage array to the new destination storage array. In the algorithm, the storage arrays' wear levels in the storage cluster are evaluated, and hot objects are moved from storage arrays with higher wear level to storage arrays with lower wear level. The result of the algorithm is to balance wear level cluster-wide to ensure endurance of the storage devices across the storage arrays of the storage cluster.

Figure 4:
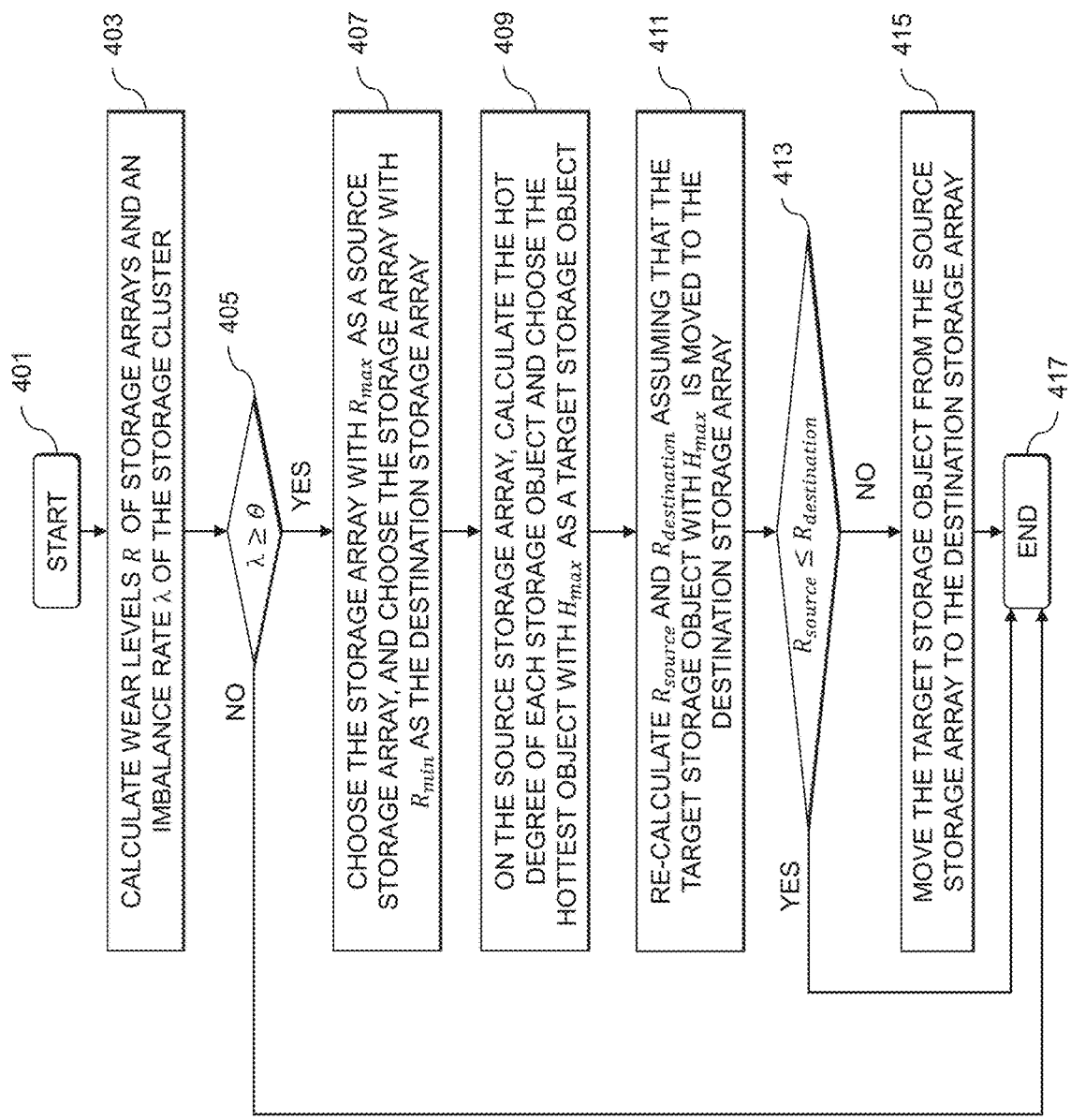
FIG. 4 shows a process flow for re-balancing wear level among storage systems of a storage cluster in an illustrative embodiment.

FIG. 4 shows a process flow of the above-described algorithm, which starts in step 401 or is initiated (e.g., by the storage cluster wear-leveling service 112) in response to some condition, such as a designated threshold period of time since a last rebalancing of a storage cluster, in response to an explicit user request to rebalance a storage cluster, in accordance with a schedule, etc. In step 403, the wear level R of the storage arrays of the storage cluster is calculated, along with the imbalance rate λ of the storage cluster. A determination is made in step 405 as to whether λ≥Θ. If the result of the step 405 determination is yes, processing continues to step 407. If the result of the step determination is no, processing ends in step 417.

In step 407, a storage array in the storage cluster with $R_{max}$ is chosen as a source storage array and a storage array in the storage cluster with $R_{min}$ is chosen as a destination storage array. On the source storage array, the hot degree of each storage object is calculated in step 409 and the hottest storage object with $H_{max}$ is chosen as a target storage object. In step 411, $R_{source}$ and $R_{destination}$ are re-calculated supposing that the target storage object with $H_{max}$ were moved to the destination storage array. A determination is made in step 413 as to whether $R_{source} \leq R_{destination}$ in the step 411 re-calculation. If the result of the step 413 determination is yes, then processing ends in step 417. If the result of the step 413 determination is no, then processing proceeds to step 415 where the target storage object is moved or migrated from the source storage array to the destination storage array. Processing then ends in step 417. It should be appreciated that a re-balancing algorithm may include iterating through the steps 401 through 417 multiple times to move or migrate multiple storage objects between different sets of source and destination storage arrays.

Figure 5:
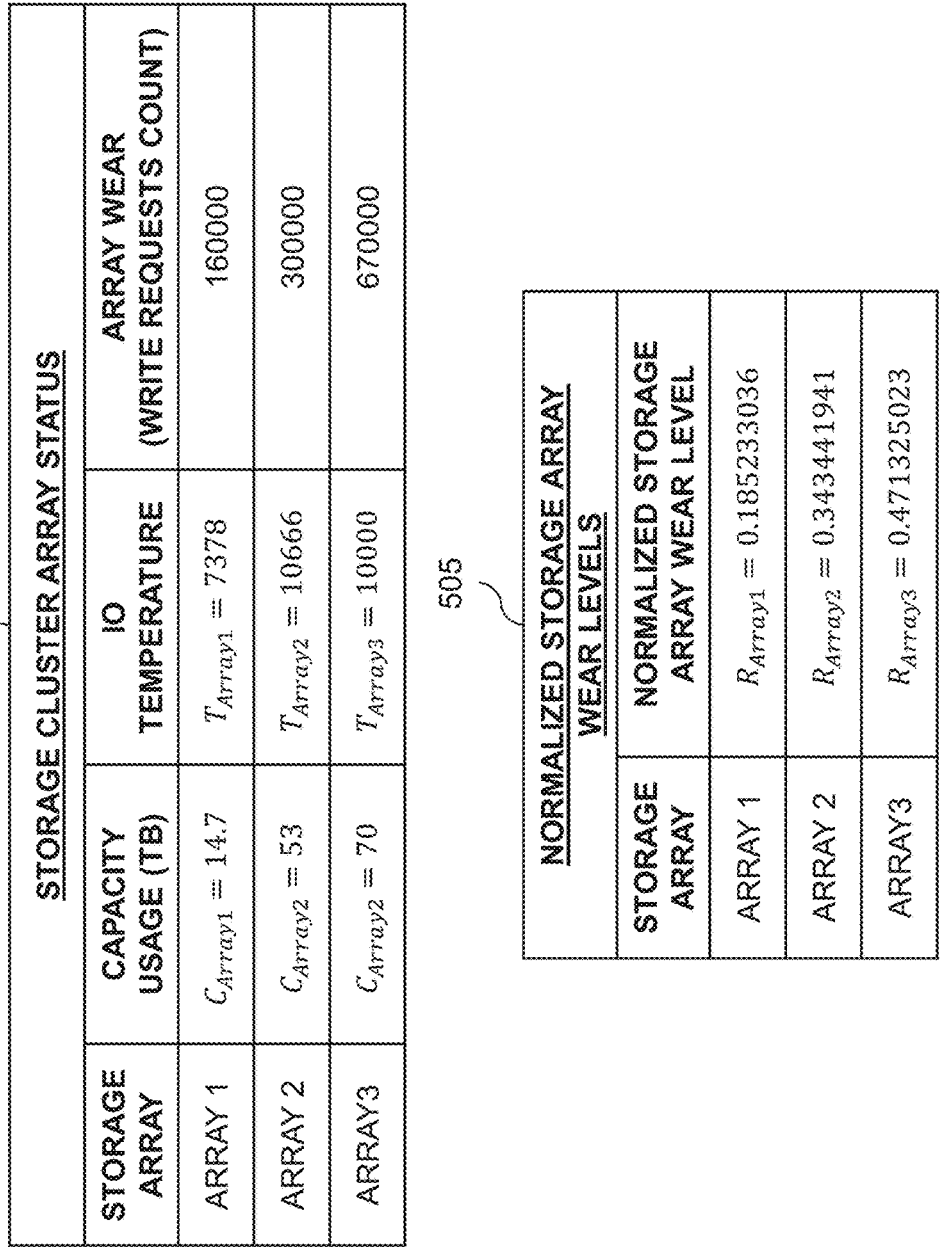
FIG. 5 shows tables of storage cluster array status information and wear levels in an illustrative embodiment.

An example of storage cluster-wide wear-leveling using the FIG. 4 process will now be described. Assume that there is a storage cluster with three storage arrays (e.g., three all-flash storage arrays) that are connected to one another with a SAN. Further assume that after some period of IO activity, the FIG. 4 algorithm is applied where the current capacity usage, IO temperature and wear status is shown in the table 500 of FIG. 5. The first storage array (Array 1) is acting as the cluster controller (that runs the storage cluster wear-leveling service 112). Further assume that each of the storage arrays has a capacity of 80 Terabytes (TB), and that the imbalance rate threshold is set to Θ=20%. Considering that the storage arrays' temperature will impact future wear, and that the storage arrays' wear reflects the current wear status, so set the $\omega_T$ and $\omega_W$ with relatively high weight, and $\omega_C$ with relatively small weight (e.g., $\omega_C$=20%, $\omega_T$=40% and $\omega_W$=40%). Per the equation above, $R_i$ is calculated to obtain normalized storage array wear levels as shown in table 505 of FIG. 5. With these results, the third storage array (Array 3) is determined to be the most worn, and the first storage array (Array 1) is the least worn. After calculating σ=15.27%, the imbalance rate of the storage cluster is λ=41.33%. As this is larger than the imbalance rate threshold Θ=20%, rebalancing is triggered for the storage arrays of the storage cluster.

Figure 6:
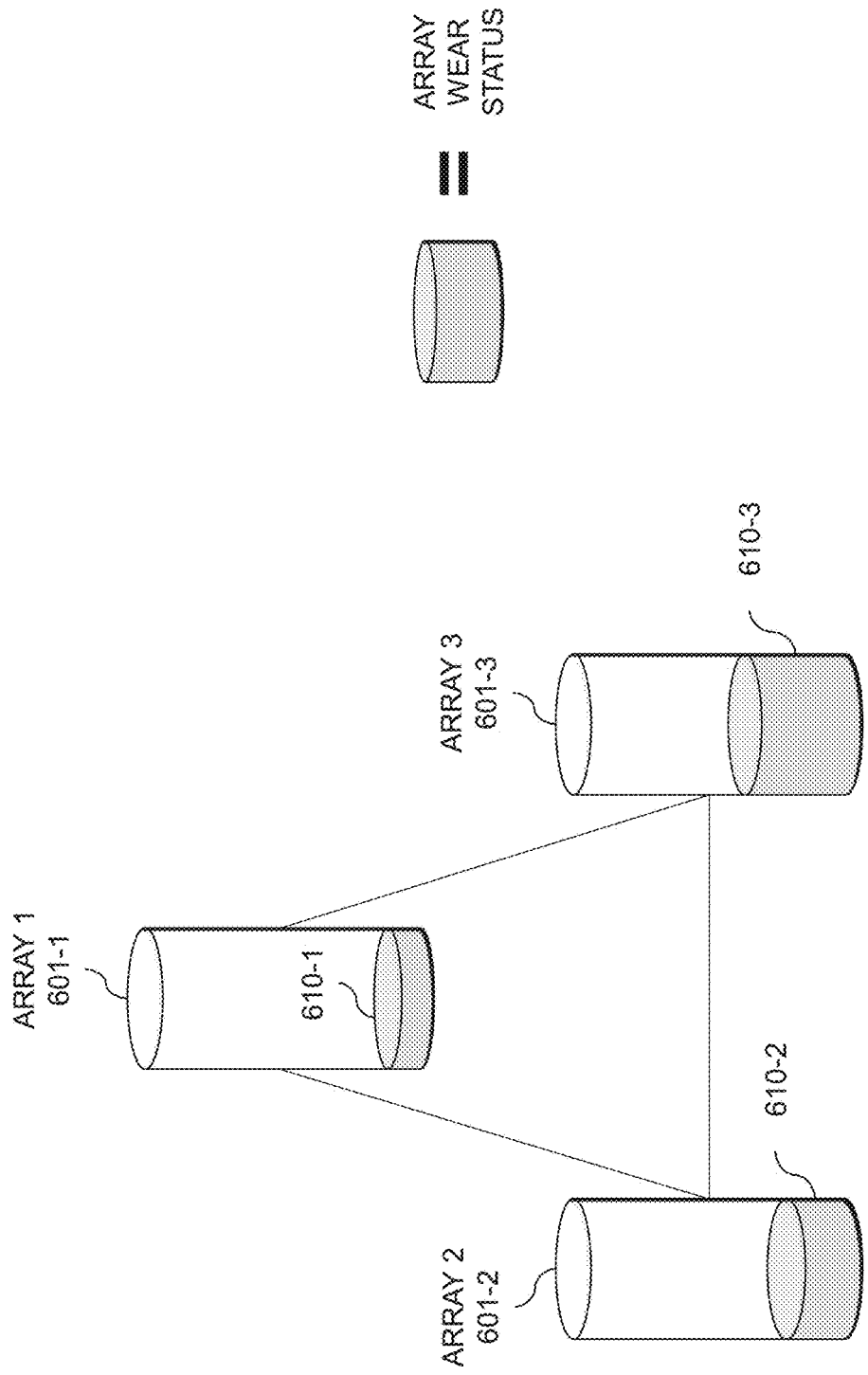
FIG. 6 shows wear levels of storage arrays of a storage cluster prior to re-balancing in an illustrative embodiment.

FIG. 6 illustrates the storage array wear status for the storage cluster prior to storage cluster-wide wear-level rebalancing. FIG. 6 shows the three storage arrays 601-1, 601-2 and 601-3, along with the associated storage array wear status 610-1, 610-2 and 610-3. FIG. 7 shows tables 700, 705 and 710 illustrating distribution of storage objects on the three storage arrays, including the size, IO temperature, and hot degree of different storage objects stored on each of the storage arrays. As indicated by FIGS. 6 and 7, the third storage array (Array 3, 601-3) is the most worn. There are nine storage objects on the third storage array, and the hot degree of each of the storage objects $H_{object}$ is calculated, and the storage objects are then sorted by the value of $H_{object}$ from large to small.

The storage cluster-wide wear leveling then starts rebalancing. The source storage array, the destination storage array and the target moving object for five iterations of the rebalancing will now be described.

In the first iteration, the source storage array is the third storage array (Array 3, 601-3), the destination storage array is first storage array (Array 1, 601-1), and the target object is Object 6 which is proposed to be moved from the third storage array to the first storage array resulting in re-calculated values of $R_{Array1}=0.24139$, $R_{Array2}=0.34344$, $R_{Array3}=0.41516$.

In the second iteration, the source storage array is the third storage array (Array 3, 601-3), the destination storage array is first storage array (Array 1, 601-1), and the target object is Object 8 which is proposed to be moved from the third storage array to the first storage array resulting in re-calculated values of $R_{Array1}=0.26411$, $R_{Array2}=0.34344$, $R_{Array3}=0.39244$.

In the third iteration, the source storage array is the third storage array (Array 3, 601-3), the destination storage array is first storage array (Array 1, 601-1), and the target object is Object 2 which is proposed to be moved from the third storage array to the first storage array resulting in re-calculated values of $R_{Array1}=0.29242$, $R_{Array2}=0.34344$, $R_{Array3}=0.36413$.

In the fourth iteration, the source storage array is the third storage array (Array 3, 601-3), the destination storage array is first storage array (Array 1, 601-1), and the target object is Object 4 which is proposed to be moved from the third storage array to the first storage array resulting in re-calculated values of $R_{Array1}=0.31944$, $R_{Array2}=0.343442$, $R_{Array3}=0.337118$.

In the fifth iteration, the source storage array is the second storage array (Array 2, 601-2), the destination storage array is first storage array (Array 1, 601-1), and the target object is Object 4 which is proposed to be moved from the second storage array to the first storage array resulting in re-calculated values of $R_{Array1}=0.36356$, $R_{Array2}=0.30596$, $R_{Array3}=0.33048$.

Figure 8:
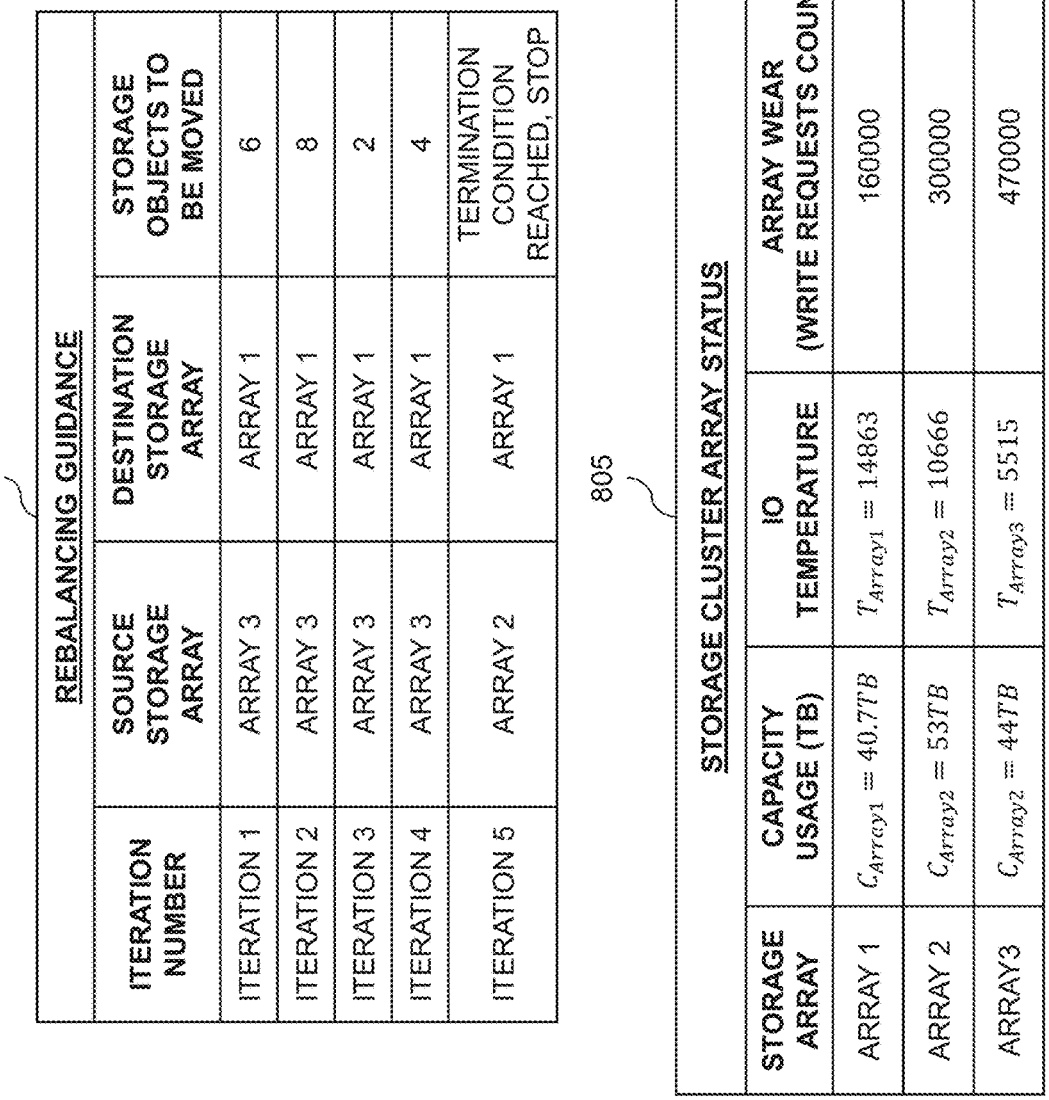
FIG. 8 shows tables of iterations of a re-balancing in a storage cluster and storage cluster array status information prior to re-balancing in an illustrative embodiment.
Figure 9:
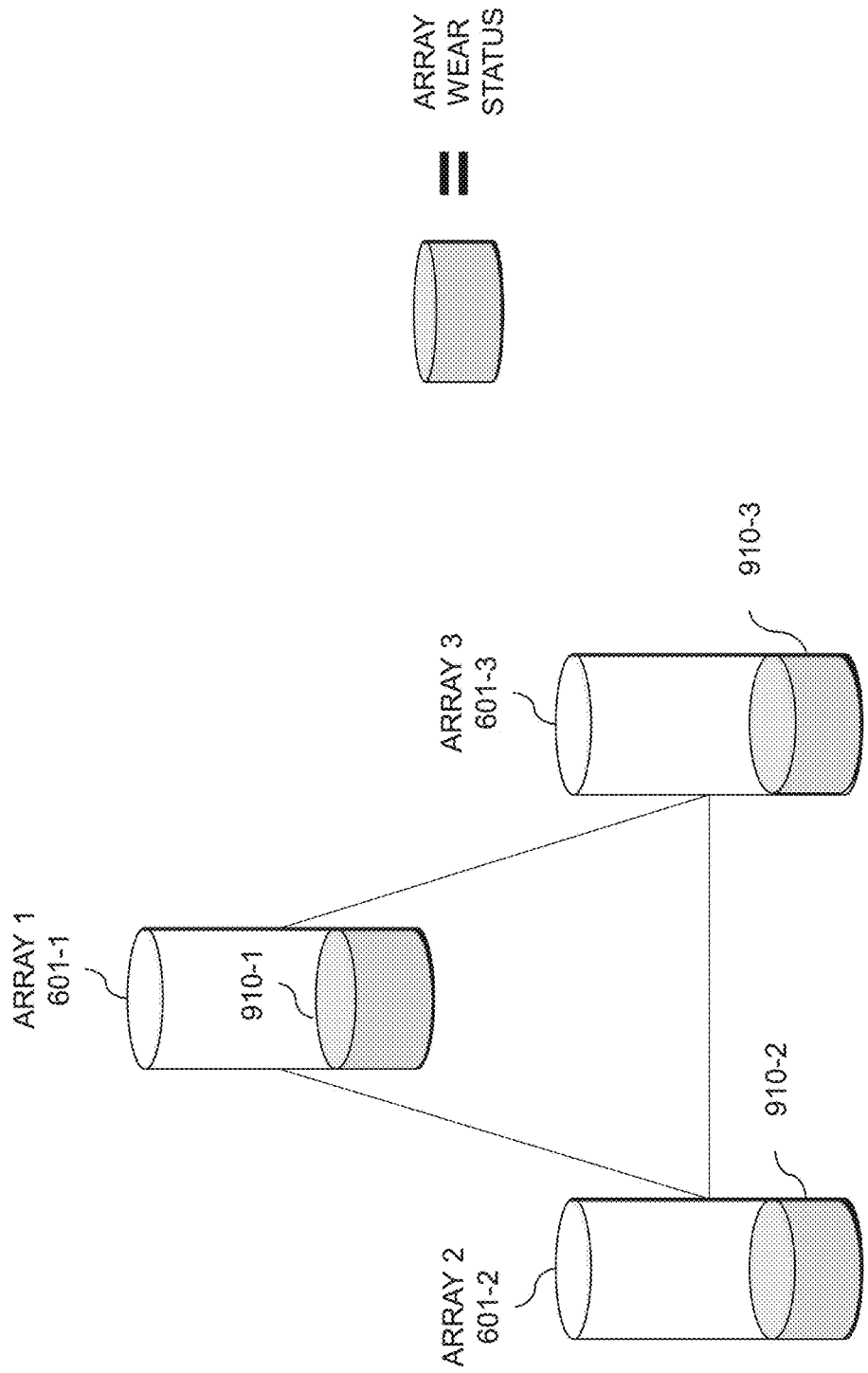
FIG. 9 shows wear levels of storage arrays of a storage cluster following re-balancing in an illustrative embodiment.

Following the fifth iteration, $R_{Array2}<R_{Array1}$ and thus the algorithm reaches an end condition and there is no need to perform storage object movement. FIG. 8 shows a table 800 of guidance for rebalancing of the storage cluster, giving the iteration number, source storage array, destination storage array and the storage object to be moved. FIG. 8 also shows a table 805 illustrating the wear level status of the storage arrays in the storage cluster following re-balancing. The imbalance rate following the re-balancing is re-calculated as $\lambda=0.03239565\approx3.2\%$. FIG. 9 illustrates the storage array wear status for the storage cluster after storage cluster-wide wear-level rebalancing, where the three storage arrays 601-1, 601-3 and 601-3 have updated storage array wear statuses 910-1, 910-2 and 910-3, respectively.

Some storage clusters may mirror data across the storage arrays or storage nodes. If moving a storage object will impact such data mirroring, the wear contribution is counted but when choosing LUNs, filesystems or other storage objects to do cluster-wide rebalancing, such mirrored LUNs, filesystems or other storage objects will not be chosen as targets. If moving the mirrored LUNs, filesystems or other storage objects will not impact the mirroring, then the algorithm may proceed as normal.

The techniques described herein also support scenarios in which a storage array is moved between storage clusters. If a new storage cluster is created using a number of different storage arrays which previously resided in other storage clusters, the storage arrays of the new storage cluster will accurately share information about their respective wear levels. If a storage array is moving from a first storage cluster to a second storage cluster, the second storage cluster will obtain information for that storage array (e.g., LUNs, filesystems and other storage objects IO temperature and storage device wear status). The algorithm can then be run to perform storage cluster-wide wear-leveling on the second storage cluster using the information obtained from the storage array that is newly-introduced to the second storage cluster. For the scenario where a new storage cluster is created from several storage arrays that previously resided in other storage clusters, the algorithm will be used to obtain information from each of the storage arrays in the newly-created storage cluster (e.g., LUNs, filesystems or other storage objects IO temperature and storage device wear status). The algorithm can then be run to perform storage cluster-wide wear-leveling on the newly-created storage clusters using the information obtained from each of the storage arrays.

Advantageously, illustrative embodiments utilize statistics-based methods for optimizing wear at the storage cluster level which improve that overall cluster-wide storage device (e.g., SSD) efficiency greatly. The techniques described are not limited to storage clusters in which all of the storage arrays or nodes belong to the same distributed file system. Instead, the techniques described support block and file storage arrays, between which there is no mapping table requirement and those storage arrays supply block and file storage service independently. It is difficult to perform the wear leveling on these and other types of storage clusters.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for performing wear leveling between storage systems of a storage cluster will now be described in greater detail with reference to FIGS. 10 and 11. Although described in the context of system 100, these platforms may also be used to implement at least portions of other information processing systems in other embodiments.

Figure 10:
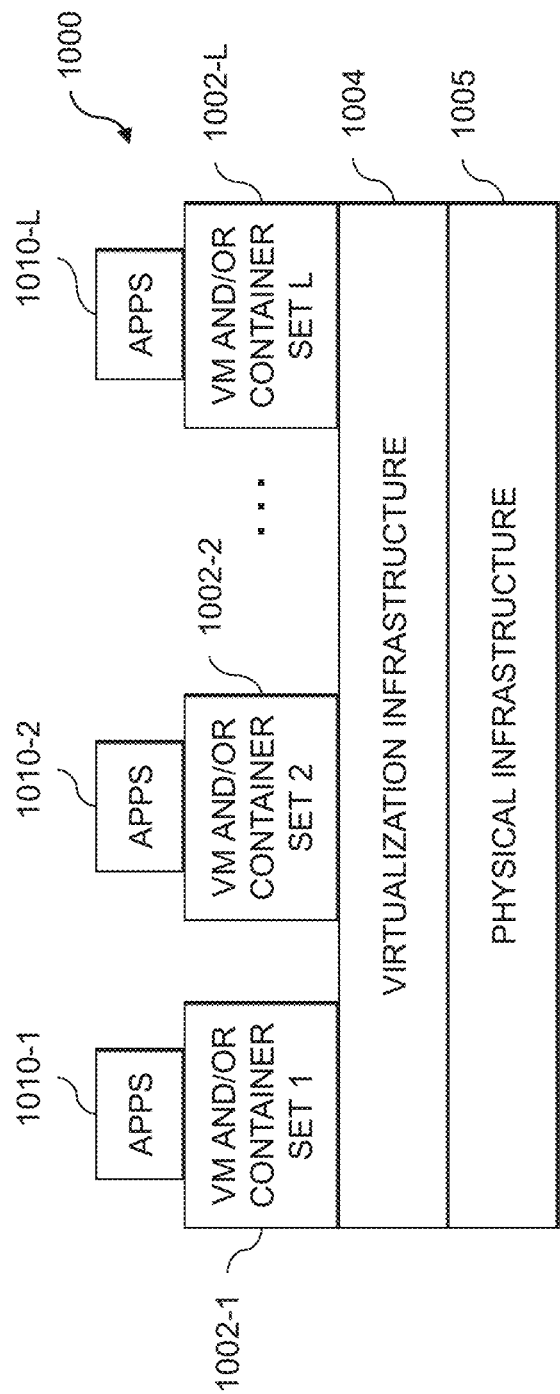

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for performing wear leveling between storage systems of a storage cluster as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage clusters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   obtaining usage information for each of two or more storage systems of a storage cluster;

determining a wear level of each of the two or more storage systems of the storage cluster based at least in part on the obtained usage information, wherein the wear level for a given one of the two or more storage systems is determined based at least in part on a combination of (i) capacity usage information for the given storage system, (ii) input-output temperature information characterizing a number of input-output requests within a specified time period for the given storage system, and (iii) cumulative write requests count information for the given storage system;

identifying a wear level imbalance of the storage cluster based at least in part on the determined wear levels of each of the two or more storage systems of the storage cluster; and based at least in part on the identified wear level imbalance of the storage cluster being greater than an imbalance threshold, moving one or more storage objects between the two or more storage systems of the storage cluster;

wherein moving the one or more storage objects between the two or more storage systems of the storage cluster is further based at least in part on a determination of a projected change in at least one of: a first wear level of a first one of the two or more storage systems of the storage cluster resulting from movement of the one or more storage objects; and a second wear level of a second one of the two or more storage systems of the storage cluster resulting from movement of the one or more storage objects; and wherein identifying the wear level imbalance of the storage cluster comprises determining an imbalance rate of the storage cluster based at least in part on a function of a first statistical measure of the wear levels of the two or more storage systems of the storage cluster and a second statistical measure of the wear levels of the two or more storage systems of the storage cluster, the second statistical measure being different than the first statistical measure.

2. The apparatus of claim 1 wherein the obtained usage information comprises:
capacity usage information for each of the two or more storage systems of the storage cluster;
input-output temperature information characterizing a number of input-output requests within the specified time period for each of the two or more storage systems of the storage cluster; and
cumulative write requests count information for each of the two or more storage systems of the storage cluster.

3. The apparatus of claim 1 wherein determining the wear level of the given storage system comprises computing a weighted sum of the capacity usage information for the given storage system, the input-output temperature information for the given storage system, and the cumulative write requests count information for the given storage system.

4. The apparatus of claim 3 wherein a first weight assigned to the capacity usage information for the given storage system is lower than a second weight assigned to the input-output temperature information and a third weight assigned to the cumulative write requests count information for the given storage system.

5. An apparatus comprising:
at least one processing device comprising a processor coupled to a memory;
the at least one processing device being configured to perform steps of:

obtaining usage information for each of two or more storage systems of a storage cluster;
determining a wear level of each of the two or more storage systems of the storage cluster based at least in part on the obtained usage information;
identifying a wear level imbalance of the storage cluster based at least in part on the determined wear levels of each of the two or more storage systems of the storage cluster; and
based at least in part on the identified wear level imbalance of the storage cluster being greater than an imbalance threshold, moving one or more storage objects between the two or more storage systems of the storage cluster;
wherein moving the one or more storage objects between the two or more storage systems of the storage cluster is further based at least in part on a determination of a projected change in at least one of: a first wear level of a first one of the two or more storage systems of the storage cluster resulting from movement of the one or more storage objects; and a second wear level of a second one of the two or more storage systems of the storage cluster resulting from movement of the one or more storage objects;
wherein identifying the wear level imbalance of the storage cluster comprises determining an imbalance rate of the storage cluster based at least in part on a function of a first statistical measure of the wear levels of the two or more storage systems of the storage cluster and a second statistical measure of the wear levels of the two or more storage systems of the storage cluster, the second statistical measure being different than the first statistical measure;
wherein the first statistical measure comprises an average of the wear levels of the two or more storage systems of the storage cluster;
wherein the second statistical measure comprises a standard deviation of the wear levels of the two or more storage systems of the storage cluster; and
wherein the function comprises a ratio of the standard deviation and the average of the wear levels of the two or more storage systems of the storage cluster.

6. The apparatus of claim 1 wherein moving the one or more storage objects between the two or more storage systems of the storage cluster comprises:
selecting the first one of the two or more storage systems of the storage cluster as a source storage system;
selecting the second one of the two or more storage systems of the storage cluster as a destination storage system; and
selecting a given storage object stored on the first storage system to be moved to the second storage system.

7. The apparatus of claim 6 wherein the first storage system has a higher determined wear level than the second storage system.

8. The apparatus of claim 6 wherein selecting the given storage object comprises:
determining, for each of at least a subset of storage objects stored on the first storage system, hot degree information characterizing a number of write requests per unit capacity; and
selecting the given storage object from among the subset of storage objects stored on the first storage system based at least in part on the determined hot degree information.

9. The apparatus of claim 6 wherein moving the one or more storage objects between the two or more storage systems of the storage cluster further comprises:
determining the first and second wear levels of the first storage system and the second storage system under an assumption that the given storage object is moved from the first storage system to the second storage system; and
moving the given storage object from the first storage system to the second storage system based at least in part on the determined first wear level of the first storage system being less than or equal to the determined second wear level of the second storage system.

10. The apparatus of claim 1 wherein moving the one or more storage objects between the two or more storage systems comprises performing two or more iterations of:
selecting the first storage system and the second storage system of the storage cluster as respective source and destination storage systems for moving at least one of the one or more storage objects;
determining, if the at least one storage object were moved from the first storage system to the second storage system, whether the first wear level of the first storage system will be less than or equal to the second wear level of the second storage system; and
moving the at least one storage object from the first storage system to the second storage system based at least in part on determining that the first wear level of the first storage system will be less than or equal to the second wear level of the second storage system.

11. The apparatus of claim 10 wherein the at least one storage object is selected based at least in part on (i) amounts of input-output requests directed to storage objects stored on the first storage system; and (ii) sizes of the storage objects stored on the first storage system.

12. The apparatus of claim 10 wherein performing the two or more iterations continues until a given iteration where it is determined that, if the at least one storage object were moved from the first storage system to the second storage system, the first wear level of the first storage system will be greater than the second wear level of the second storage system.

13. The apparatus of claim 1 wherein a first one of the two or more storage systems is part of a first distributed filesystem and a second one of the two or more storage systems is part of a second distributed filesystem different than the first distributed filesystem.

14. The apparatus of claim 1 wherein a first one of the two or more storage systems utilizes block-based storage and a second one of the two or more storage systems utilizes file-based storage, and wherein the first and second storage systems supply block and file storage services independent of one another.

15. A computer program product comprising a non-transitory processor-readable storage medium having stored therein program code of one or more software programs, wherein the program code when executed by at least one processing device causes the at least one processing device to perform steps of:
obtaining usage information for each of two or more storage systems of a storage cluster;
determining a wear level of each of the two or more storage systems of the storage cluster based at least in part on the obtained usage information, wherein the wear level for a given one of the two or more storage systems is determined based at least in part on a combination of (i) capacity usage information for the given storage system, (ii) input-output temperature information characterizing a number of input-output requests within a specified time period for the given storage system, and (iii) cumulative write requests count information for the given storage system;
identifying a wear level imbalance of the storage cluster based at least in part on the determined wear levels of each of the two or more storage systems of the storage cluster; and
based at least in part on the identified wear level imbalance of the storage cluster being greater than an imbalance threshold, moving one or more storage objects between the two or more storage systems of the storage cluster;
wherein moving the one or more storage objects between the two or more storage systems of the storage cluster is further based at least in part on a determination of a projected change in at least one of: a first wear level of a first one of the two or more storage systems of the storage cluster resulting from movement of the one or more storage objects; and a second wear level of a second one of the two or more storage systems of the storage cluster resulting from movement of the one or more storage objects; and
wherein identifying the wear level imbalance of the storage cluster comprises determining an imbalance rate of the storage cluster based at least in part on a function of a first statistical measure of the wear levels of the two or more storage systems of the storage cluster and a second statistical measure of the wear levels of the two or more storage systems of the storage cluster, the second statistical measure being different than the first statistical measure.

16. The computer program product of claim 15 wherein moving the one or more storage objects between the two or more storage systems comprises performing two or more iterations of:
selecting the first storage system and the second storage system of the storage cluster as respective source and destination storage systems for moving at least one of the one or more storage objects;
determining, if the at least one storage object were moved from the first storage system to the second storage system, whether the first wear level of the first storage system will be less than or equal to the second wear level of the second storage system; and
moving the at least one storage object from the first storage system to the second storage system based at least in part on determining that the first wear level of the first storage system will be less than or equal to the second wear level of the second storage system.

17. The computer program product of claim 16 wherein the at least one storage object is selected based at least in part on (i) amounts of input-output requests directed to storage objects stored on the first storage system; and (ii) sizes of the storage objects stored on the first storage system.

18. A method comprising:
obtaining usage information for each of two or more storage systems of a storage cluster;
determining a wear level of each of the two or more storage systems of the storage cluster based at least in part on the obtained usage information, wherein the wear level for a given one of the two or more storage systems is determined based at least in part on a combination of (i) capacity usage information for the given storage system, (ii) input-output temperature information characterizing a number of input-output requests within a specified time period for the given storage system, and (iii) cumulative write requests count information for the given storage system;

identifying a wear level imbalance of the storage cluster based at least in part on the determined wear levels of each of the two or more storage systems of the storage cluster; and based at least in part on the identified wear level imbalance of the storage cluster being greater than an imbalance threshold, moving one or more storage objects between the two or more storage systems of the storage cluster;

wherein moving the one or more storage objects between the two or more storage systems of the storage cluster is further based at least in part on a determination of a projected change in at least one of: a first wear level of a first one of the two or more storage systems of the storage cluster resulting from movement of the one or more storage objects; and a second wear level of a second one of the two or more storage systems of the storage cluster resulting from movement of the one or more storage objects;

wherein identifying the wear level imbalance of the storage cluster comprises determining an imbalance rate of the storage cluster based at least in part on a function of a first statistical measure of the wear levels of the two or more storage systems of the storage cluster and a second statistical measure of the wear levels of the two or more storage systems of the storage cluster, the second statistical measure being different than the first statistical measure; and wherein the method is performed by at least one processing device comprising a processor coupled to a memory.

19. The method of claim 18 wherein moving the one or more storage objects between the two or more storage systems comprises performing two or more iterations of:

selecting the first storage system and the second storage system of the storage cluster as respective source and destination storage systems for moving at least one of the one or more storage objects;

determining, if the at least one storage object were moved from the first storage system to the second storage system, whether the first wear level of the first storage system will be less than or equal to the second wear level of the second storage system; and moving the at least one storage object from the first storage system to the second storage system based at least in part on determining that the first wear level of the first storage system will be less than or equal to the second wear level of the second storage system.

20. The method of claim 19 wherein the at least one storage object is selected based at least in part on (i) amounts of input-output requests directed to storage objects stored on the first storage system; and (ii) sizes of the storage objects stored on the first storage system.

* * * * *